(12) United States Patent
Sasakawa

(10) Patent No.: US 9,816,251 B2
(45) Date of Patent: Nov. 14, 2017

(54) CAB AND BULLDOZER

(71) Applicant: KOMATSU LTD., Tokyo (JP)

(72) Inventor: Akira Sasakawa, Hirakata (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 15/037,155

(22) PCT Filed: Jun. 8, 2015

(86) PCT No.: PCT/JP2015/066480
§ 371 (c)(1),
(2) Date: May 17, 2016

(87) PCT Pub. No.: WO2016/199190
PCT Pub. Date: Dec. 15, 2016

(65) Prior Publication Data
US 2017/0175358 A1 Jun. 22, 2017

(51) Int. Cl.
*B60N 2/46* (2006.01)
*E02F 9/16* (2006.01)
(Continued)

(52) U.S. Cl.
CPC .............. *E02F 9/16* (2013.01); *B60N 2/46* (2013.01); *E02F 3/76* (2013.01); *E02F 3/7609* (2013.01);
(Continued)

(58) Field of Classification Search
CPC ........ B60N 2/46; E02F 3/7604; E02F 3/7609; E02F 3/96; E02F 3/961; E02F 3/963;
(Continued)

(56) References Cited

U.S. PATENT DOCUMENTS 3,956,835 A * 5/1976 Evenson ............... E02F 3/8152
172/438
4,895,040 A 1/1990 Soederberg
(Continued)

FOREIGN PATENT DOCUMENTS

DE 102015106386 A1 * 5/2016 ............... B60N 2/46
JP S64-70809 A 3/1989
(Continued)

OTHER PUBLICATIONS

Catepillar, "New Dozers D10T2", [online], [searched on Mar. 17, 2015], the Internet (URL:http://www.cat.com/en_US/products/new/equipment/dozers/large-dozers/18500099.html).
(Continued)

*Primary Examiner* — Glenn Dayoan
*Assistant Examiner* — Paul Chenevert
(74) *Attorney, Agent, or Firm* — Drinker Biddle & Reath LLP

(57) ABSTRACT

Provided is a cab which can improve the workability of ripping. The cab includes an operator's seat placed in the cab and a right armrest placed rightward of the operator's seat in the cab. A front end portion of the operator's seat is tilted rightward with respect to a front-rear direction (the direction of X) of the cab as seen in a plan view. The right armrest includes a front region including a front end of the right armrest and a rear region including a rear end of the right armrest. The rear region includes a portion placed at a shorter distance from a midline bisecting the operator's seat as seen in a plan view, than a distance between the front region and the midline.

6 Claims, 6 Drawing Sheets

(51) Int. Cl.
*E02F 3/76* (2006.01)
*E02F 9/20* (2006.01)
*E02F 9/22* (2006.01)

(52) U.S. Cl.
CPC .......... *E02F 9/2004* (2013.01); *E02F 3/7604* (2013.01); *E02F 9/2271* (2013.01)

(58) Field of Classification Search
CPC ... E02F 5/32; E02F 5/323; E02F 5/326; E02F 9/16; E02F 9/2004; E02F 9/2012; E02F 9/2271; G05G 1/62
See application file for complete search history.

(56) References Cited

U.S. PATENT DOCUMENTS

| | | | | |
|---|---|---|---|---|
| 5,409,080 A | * | 4/1995 | Templeton | A01B 71/02 180/326 |
| 5,584,346 A | * | 12/1996 | Sakamoto | E02F 9/2004 172/4.5 |
| D427,207 S | * | 6/2000 | Altmann | B60N 2/46 D15/28 |
| D427,208 S | * | 6/2000 | Altmann | B60N 2/46 D15/28 |
| 6,276,749 B1 | * | 8/2001 | Okazawa | B60N 2/4693 180/329 |
| 6,286,897 B1 | * | 9/2001 | Ruhter | A01B 63/00 180/89.12 |
| 6,634,453 B2 | | 10/2003 | Arthur et al. | |
| 8,056,980 B2 | * | 11/2011 | Koutsky | B60N 2/14 180/329 |
| 8,434,562 B2 | * | 5/2013 | Miyasaka | E02F 5/32 172/431 |
| 2017/0016211 A1 | * | 1/2017 | Arimatsu | E02F 9/264 |
| 2017/0167111 A1 | * | 6/2017 | Katayanagi | E02F 9/16 |

FOREIGN PATENT DOCUMENTS

| | | | | | |
|---|---|---|---|---|---|
| JP | 10252100 A | * | 9/1998 | ............ | E02F 9/2004 |
| JP | 11338568 A | * | 12/1999 | ............... | G05G 1/04 |
| JP | 2000129725 A | * | 5/2000 | ............ | E02F 9/2004 |
| JP | 2000148273 A | * | 5/2000 | ............ | E02F 9/2004 |
| JP | 2007-247337 A | | 9/2007 | | |
| JP | 2009219882 A | * | 10/2009 | ............ | B64D 11/06 |
| JP | 2015-096421 A | | 5/2015 | | |
| JP | 5926869 B1 | * | 5/2016 | ................ | E02F 9/16 |

OTHER PUBLICATIONS

Keiichi Mokka et al., "Introduction of Wheel Dozer Model WD600-6", Komatsu Technical Report, vol. 55, No. 162, May 12, 2009, p. 40-45.

\* cited by examiner

CAB AND BULLDOZER

TECHNICAL FIELD

The present invention relates to a cab and a bulldozer which includes the cab.

BACKGROUND ART

A bulldozer includes, as a work implement, a blade on a front side and a ripper on a backside. In a cab, a lever for operation of the work implement is placed rightward of an operator's seat. A control lever for the ripper is placed rearward of a control lever for the blade. An armrest is placed rightward of the operator's seat. An operator operates the control levers of the work implement with a right elbow rested on the armrest.

The operations by the ripper are frequently carried out in a large-sized bulldozer. The operator operates the ripper with looking rearward. Therefore, in order to make the turn-round angle of the operator smaller during a ripping operation, the bulldozer, in which the operator's seat is placed at a tilt with respect to a front-rear direction of the cab, is conventionally proposed (for example, NPD 1).

SUMMARY OF INVENTION

Technical Problem

If the operator rests the elbow on the armrest in the case of ripper operation, the workability may deteriorate, for example, becoming difficult to grasp the ripper control lever or becoming difficult to carry out rotation of the body back, and the like.

An object of the present invention is to provide a cab which can improve the workability of ripping and a bulldozer including the cab.

Solution to Problem

A cab of the present invention is a cab for a work vehicle and includes an operator's seat placed in the cab and an armrest placed rightward of the operator's seat in the cab. The operator's seat includes a front end portion tilted rightward with respect to a front-rear direction of the cab as seen in a plan view. The armrest includes a front region including a front end of the armrest and a rear region including a rear end of the armrest. The rear region includes a portion placed at a shorter distance from a midline bisecting the operator's seat as seen in a plan view, than a distance between the front region and the midline.

Regarding the cab, a left end of the rear end of the armrest protrudes rearward with respect to a line perpendicular to the midline of the operator's seat and passing a right end of the rear end.

Regarding the cab, a left edge of the rear region protrudes toward the midline of the operator's seat with respect to a left edge of the front region.

Regarding the cab, a right edge of the armrest extends along the front-rear direction of the cab.

Regarding the cab, the front region of the armrest includes a left edge parallel to the midline.

Regarding the cab, a right edge of the rear region includes a portion protruding upward with respect to a left edge of the rear region.

Regarding the cab, the midline of the operator's seat tilts with respect to the front-rear direction of the cab, so that the closer the midline is to its frontmost end the further it tilts rightward and the closer the midline is to its rearmost end the further it tilts leftward.

The cab further includes a lever for operating a work implement placed rearward of the cab. The armrest is placed between the lever and the operator's seat.

A bulldozer of the present invention includes any of the above-described cabs.

Advantageous Effects of Invention

According to the present invention, the workability of ripping can be improved.

DESCRIPTION OF EMBODIMENTS

Figure 1:
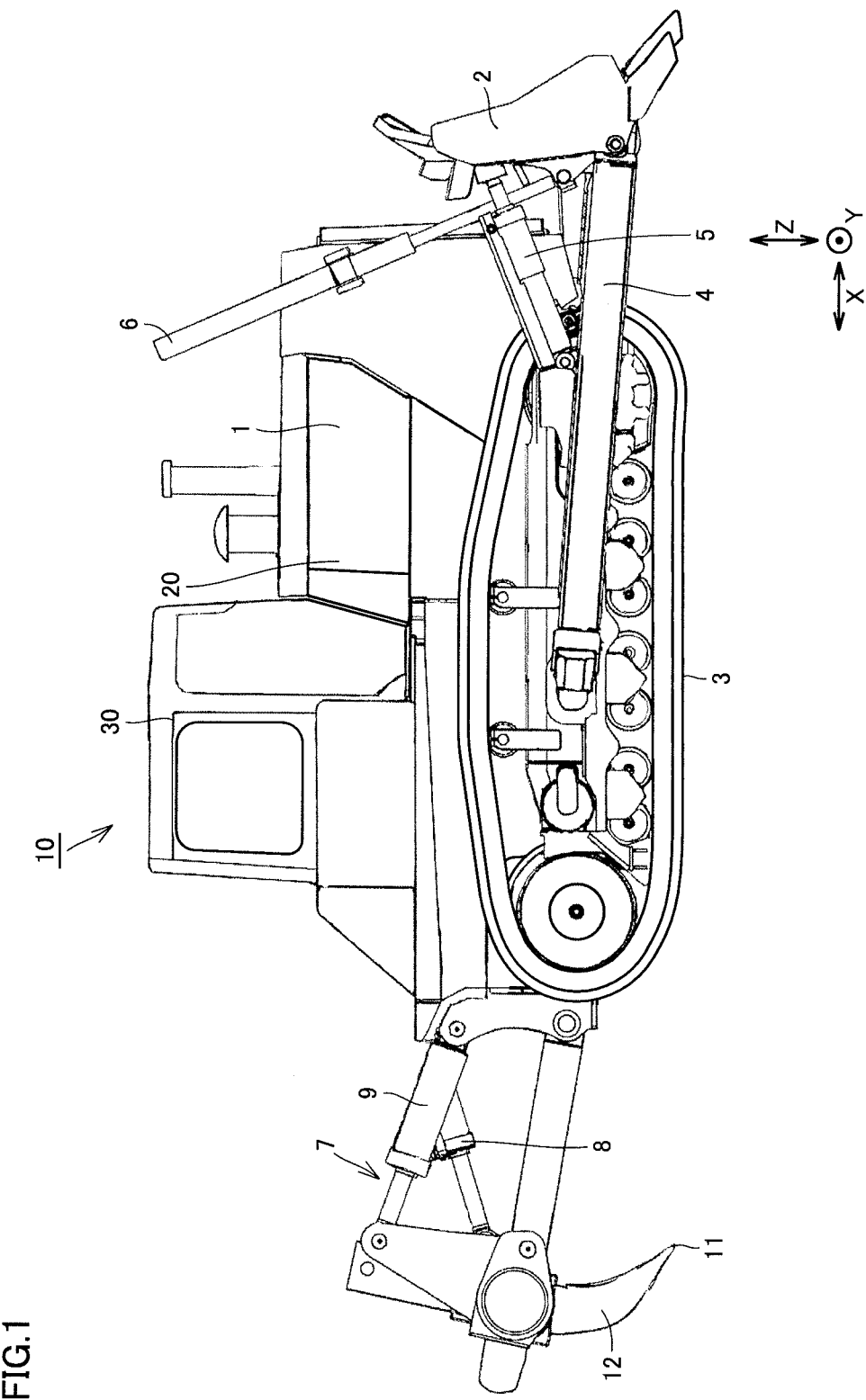
FIG. 1 is a side view schematically showing the configuration of a bulldozer in the first embodiment of the present invention.

Hereinafter, embodiments of the present invention will be described based on the drawings.

First Embodiment

First, the configuration of a bulldozer which is an example of a work vehicle to which the idea of the present invention is applicable will be described.

In the present embodiment, the forward side (front side) of an operator sitting in a cab 30 is defined as the forward side of a bulldozer 10, the rear side of the operator sitting therein is defined as the rear side of bulldozer 10, the left side of the operator in the seated state is defined as the left side of bulldozer 10, and the right side of the operator in the seated state is defined as the right side of bulldozer 10. The front-rear direction means the front-rear direction seen from the operator sitting on an operator's seat of cab 30. The left/right direction, the vehicle width direction or the lateral direction is the direction of the right and left seen from the above-described operator. In the drawings below, the front-rear direction is shown with an arrow X in the drawings, the left/right direction is shown with an arrow Y in the drawings, and the upward/downward direction is shown with an arrow Z in the drawings.

FIG. 1 is a side view schematically showing the configuration of a bulldozer 10 in the first embodiment of the present invention. As shown in FIG. 1, bulldozer 10 of the present embodiment mainly includes a traveling apparatus, a vehicular body 1, a blade 2, and a ripper apparatus 7. The traveling apparatus has a pair of left and right crawler travel units 3 at a distance in the vehicle width direction (the direction of Y). Vehicular body 1 is placed between the pair of left and right crawler travel units 3. Blade 2 is placed at the front position of vehicular body 1. Ripper apparatus 7 is placed at the rear position of vehicular body 1.

Vehicular body 1 has a cab (operator's cab) 30 and an engine compartment 20. Cab 30 is placed in the rear upper part of vehicular body 1. Engine compartment 20 is placed frontward of cab 30. Engine compartment 20 is placed between cab 30 and blade 2. An engine which is not illustrated is accommodated in engine compartment 20. Cab 30 is configured so that it may have the operator's seat inside for the operator to be seated and may surround the operator's seat.

Bulldozer 10 includes blade 2 as a work implement in the front thereof. Blade 2 is the work implement for working the digging of earth and sand, land grading, and the like. Blade 2 has its right and left sides both supported by frames 4. Blade 2 is driven by tilt cylinders 5 and lift cylinders 6.

Bulldozer 10 includes ripper apparatus 7 as a work implement in the rear thereof. Ripper apparatus 7 is the work implement for penetrating and crushing the hard material, such as rock. Ripper apparatus 7 has a shank 12. A ripper tip 11 is provided at the lower end of shank 12. Ripper apparatus 7 thrusts ripper tip 11 into rock and the like and performs cutting or crushing with the traction by the traveling apparatus. Ripper apparatus 7 is driven by lift cylinders 8 and tilt cylinders 9.

Figure 2:
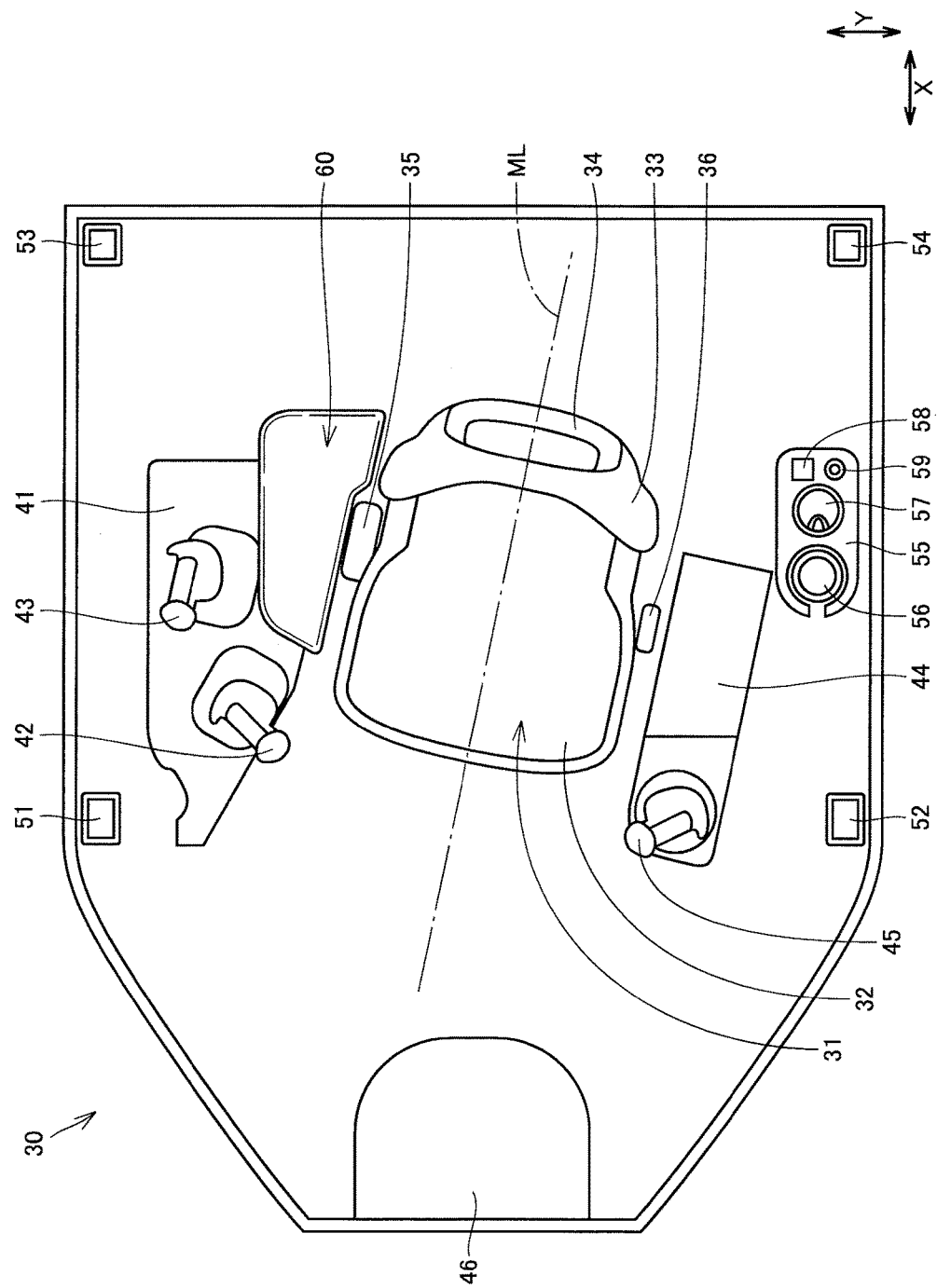
FIG. 2 is a plan view schematically showing the configuration inside a cab shown in FIG. 1.

FIG. 2 is a plan view schematically showing the configuration inside cab 30 shown in FIG. 1. As shown in FIG. 2, an operator's seat 31 is placed inside cab 30. Cab 30 has a roof portion which is arranged to cover operator's seat 31, and a plurality of pillars which support the roof portion. Each pillar extends along the upward/downward direction (the direction of Z), and is connected with the floor portion and the roof portion of cab 30.

The plurality of pillars have front pillars 51 and 52 and rear pillars 53 and 54. Front pillars 51 and 52 are placed frontward with respect to operator's seat 31 in the front-rear direction (the direction of X). Rear pillars 53 and 54 are placed rearward with respect to operator's seat 31 in the front-rear direction (the direction of X). Front pillar 51 and rear pillar 53 are placed rightward with respect to operator's seat 31 in the vehicle width direction (the direction of Y). Front pillar 52 and rear pillar 54 are placed leftward with respect to operator's seat 31 in the vehicle width direction (the direction of Y).

Operator's seat 31 is placed near a substantially center of cab 30. Operator's seat 31 has a seating portion 32, a back portion 33, and a headrest 34. The operator who gets into cab 30 is seated on seating portion 32. In order that the operator who is seated on seating portion 32 may lean the back, back portion 33 is provided. Headrest 34 is attached to the upper end of back portion 33. Headrest 34 protects the operator's head from an impact.

A front console 46 is placed frontward of operator's seat 31 in cab 30. A control panel, meters and switches are attached to front console 46.

A right console 41 is placed rightward of operator's seat 31 in cab 30. Levers for operation of the work implement are provided on right console 41. A blade control lever 42 for operating blade 2 and a ripper control lever 43 for operating ripper apparatus 7 are attached to right console 4. Blade control lever 42 is placed at the front side of right console 41. Ripper control lever 43 is placed right-rearward of blade control lever 42.

A right armrest 60 is placed rightward of operator's seat 31 in cab 30. Right armrest 60 is placed laterally with respect to operator's seat 31. In the vehicle width direction (the direction of Y), right armrest 60 is placed between operator's seat 31 and right console 41. Right armrest 60 is placed between ripper control lever 43 and operator's seat 31.

A left console 44 is placed leftward of operator's seat 31 in cab 30. On left console 44, a lever for travel operation of bulldozer 10 is provided. A travel control lever 45 is attached to left console 44. Travel control lever 45 is placed at the front side of left console 44. The rear side of left console 44 is provided as a left armrest.

A belt accommodation portion 35 which accommodates a seat belt is placed rightward of operator's seat 31 in cab 30. Belt accommodation portion 35 is placed between operator's seat 31 and right armrest 60. A locking portion 36 which locks the seat belt is placed leftward of operator's seat 31 in cab 30. Locking portion 36 is placed between operator's seat 31 and left console 44. The seat belt is pulled out from belt accommodation portion 35, and a locking metal fitting at a tip of the seat belt is locked to locking portion 36, thereby the seat belt is worn around the body of the operator sitting on operator's seat 31.

A side rack 55 is placed leftward of operator's seat 31 in cab 30. Side rack 55 is placed laterally with respect to operator's seat 31. On side rack 55, a cup holder 56, an ashtray 57, a cigarette lighter 58, and an external connection terminal 59 are provided. Cup holder 56, ashtray 57, cigarette lighter 58, and external connection terminal 59 configure the handled portion handled by the operator sitting on operator's seat 31.

An alternate long and short dash line in FIG. 2 shows a midline ML of operator's seat 31. Here, the midline is a virtual line by which operator's seat 31 is equally divided into right part and left part. In a front view of operator's seat 31, midline ML passes along the center of the right and left of operator's seat 31. In a rear view of operator's seat 31, midline ML passes along the center of the right and left of operator's seat 31. As seen in the plan view shown in FIG. 2, midline ML passes the center of operator's seat 31, and extends in the position which bisects operator's seat 31.

If operator's seat 31 has a symmetrical shape, midline ML is on the plane of symmetry. However, operator's seat 31 of the present embodiment may not be completely symmetrical. Midline ML may be a line which bisects a member with a symmetrical shape which configures a portion of operator's seat 31. Midline ML may be a line which bisects a part with a symmetrical shape of a member which configures a portion of operator's seat 31. For example, midline ML may be the line which bisects seating portion 32, may be the line which bisects back portion 33, or may be the line which bisects headrest 34.

As shown in FIG. 2, midline ML of operator's seat 31 tilts with respect to the front-rear direction (the direction of X) of cab 30, so that the closer the midline is to its frontmost end the further it tilts rightward and the closer the midline is to its rearmost end the further it tilts leftward. Operator's seat 31 is fixed in cab 30 so that a front end portion FE tilts rightward with respect to the front-rear direction (the direction of X) of cab 30 as seen in the plan view. Front end portion FE is a portion of the front end of operator's seat 31 located on midline ML as seen in the plan view.

Figure 3:
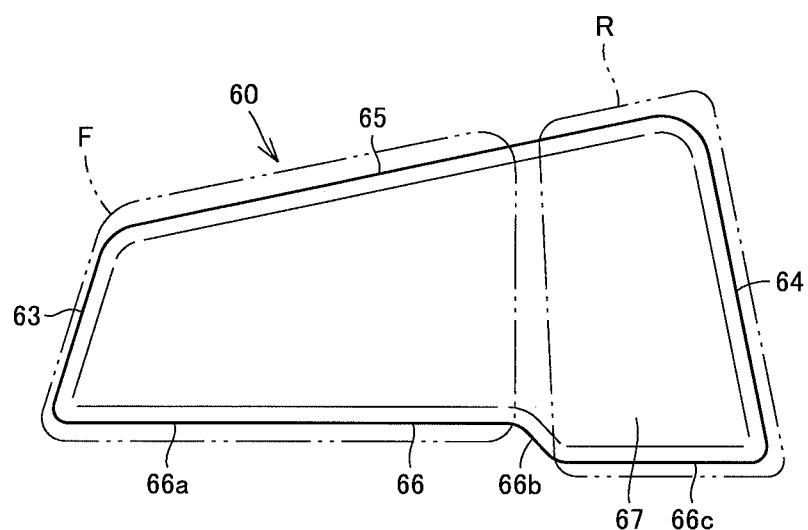
FIG. 3 is an enlarged view showing the details of a right armrest.
Figure 4:
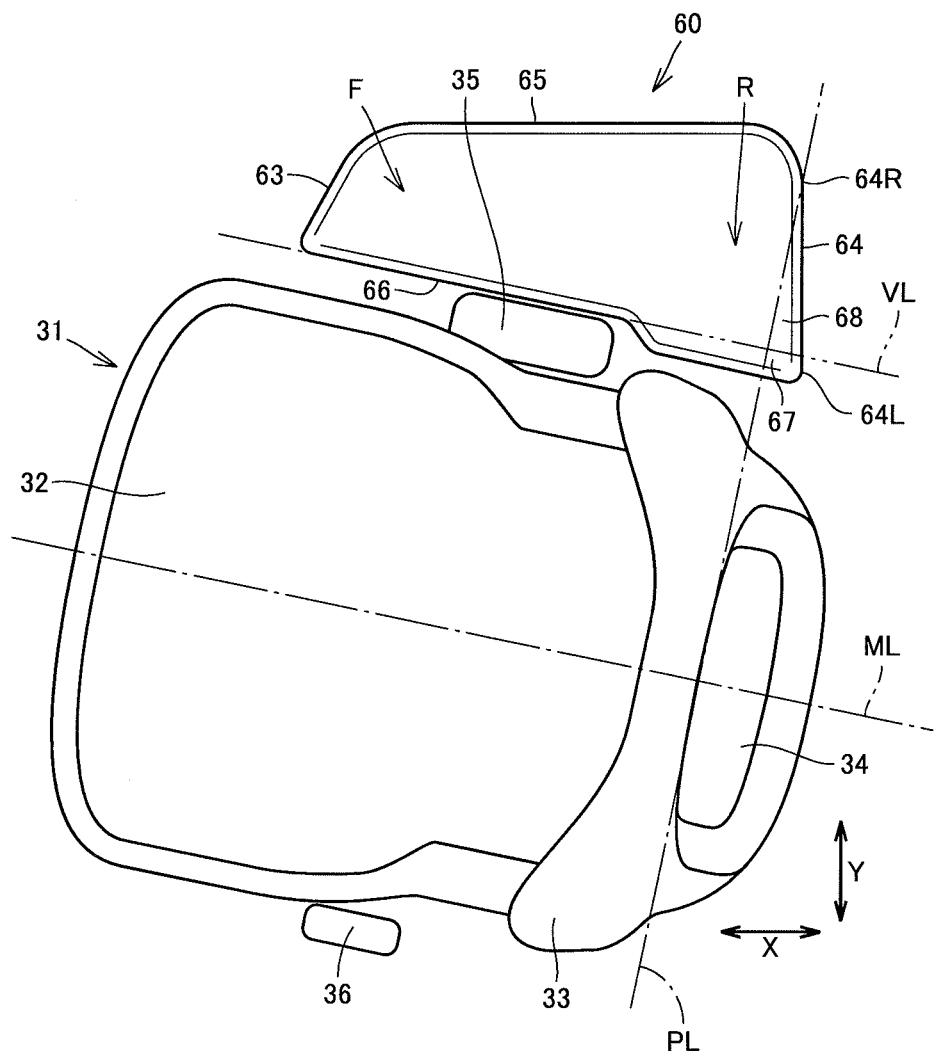
FIG. 4 is a enlarged view showing the details of arrangement of an operator's seat and the right armrest.

FIG. 3 is an enlarged view showing the details of right armrest 60. FIG. 4 is a enlarged view showing the details of arrangement of operator's seat 31 and right armrest 60. The upper surface of right armrest 60 of the present embodiment has a substantially flat shape. As shown in FIG. 3 and FIG. 4, right armrest 60 has a front end 63, a rear end 64, a right edge 65, and a left edge 66.

Front end 63 of right armrest 60 configures the frontmost part of the peripheries of right armrest 60 as seen in the plan view. Front end 63 tilts with respect to the front-rear direction (the direction of X) and the left/right direction (the direction of Y) of cab 30, so that the closer the front end is to its frontmost end the further it tilts leftward and the closer the front end is to its rearmost end the further it tilts rightward.

Rear end 64 of right armrest 60 configures the rearmost part of the peripheries of right armrest 60 as seen in the plan view. Rear end 64 extends along the left/right direction (the direction of Y) of cab 30. Rear end 64 has a right side end portion 64R and a left side end portion 64L. Right side end portion 64R is one endpoint of a line segment which configures rear end 64 as seen in the plan view of right armrest 60. Left side end portion 64L is the other endpoint of the line segment which configures rear end 64 as seen in the plan view of right armrest 60.

Right edge 65 of right armrest 60 configures the edge on a side away from operator's seat 31 of the peripheries of right armrest 60 as seen in the plan view. Right edge 65 extends along the front-rear direction (the direction of X) of cab 30. Right edge 65 extends in parallel with the front-rear direction (the direction of X) of cab 30 in the plan view. The direction along which front end 63 extends and the direction along which right edge 65 extends intersect with each other to form an obtuse angle. The direction along which rear end 64 extends and the direction along which right edge 65 extends intersect with each other to form a right angle.

Left edge 66 of right armrest 60 configures the edge on the side close to operator's seat 31 of the peripheries of right armrest 60 as seen in the plan view. Left edge 66 has a crooked shape. Left edge 66 has a front portion 66a, a rear portion 66c, and a connection portion 66b which connects front portion 66a and rear portion 66c. Front portion 66a extends in parallel with midline ML of operator's seat 31. Rear portion 66c extends in parallel with midline ML of operator's seat 31.

Connection portion 66b extends in non-parallel with midline ML of operator's seat 31. Connection portion 66b tilts with respect to the front-rear direction (the direction of X) of cab 30 so that the closer the connection portion is to its frontmost end the further it tilts rightward and the closer the connection portion is to its rearmost end the further it tilts leftward. The angle at which the direction in which connection portion 66b extends tilts with respect to the front-rear direction of cab 30 is larger than the angle at which midline ML tilts with respect to the front-rear direction of cab 30.

Front portion 66a and rear portion 66c are connected with connection portion 66b interposed therebetween. Rear portion 66c is placed closer to midline ML of operator's seat 31 than front portion 66a. Rear portion 66c is offset with respect to front portion 66a to the side close to midline ML of operator's seat 31.

The direction in which front portion 66a of left edge 66 extends and the direction in which front end 63 extends intersect with each other to form an acute angle. The direction in which rear portion 66c of left edge 66 extends and the direction in which rear end 64 extends intersect with each other to form an acute angle.

Left edge 66 of right armrest 60 may not be restricted to the crooked shape shown in FIG. 3, but may be formed in a linear shape where it extends to tilt with respect to the front-rear direction (the direction of X) and left/right direction (the direction of Y) of cab 30 as seen in the plan view.

Right armrest 60 has a front region F including front end 63 and a rear region R including rear end 64. The region surrounded with the chain double-dashed line in FIG. 3 shows front region F and rear region R, respectively. The front portion of three portions into which right armrest 60 is virtually divided in the front-rear direction configures front region F, and the rear portion of the three portions configures rear region R.

Front portion 66a of left edge 66 is included in front region F. Front portion 66a configures the left edge of front region F. Rear portion 66c of left edge 66 is included in rear region R. Rear portion 66c configures the left edge of rear region R.

The left edge of front region F and the left edge of rear region R extend in parallel with midline ML of operator's seat 31. The crookedness is formed between the left edge of front region F and the left edge of rear region R.

Front region F and rear region R are not limited to the configuration defined in the range shown in FIG. 3. An arbitrary part which includes front end 63 and an arbitrary part which includes rear end 64 may be selected from right armrest 60 so that they may not overlap with each other, and these parts may be respectively defined as front region F and rear region R.

A perpendicular line PL shown with the chain dashed line in FIG. 4 is a line passing right side end portion 64R of rear end 64 of right armrest 60 and perpendicular to midline ML of operator's seat 31. Left side end portion 64L of rear end 64 of right armrest 60 protrudes rearward with respect to perpendicular line PL. Right armrest 60 has a protrusion portion 68 which protrudes rearward with respect to perpendicular line PL, as shown in FIG. 4. Rear end 64 of right armrest 60 projects rearward.

A virtual line VL shown with the chain double-dashed line in FIG. 4 is a line parallel to midline ML of operator's seat 31. Front portion 66a of left edge 66 of right armrest 60 extends along virtual line VL. Front region F of right armrest 60 has a left edge portion (front portion 66a of left edge 66) parallel to midline ML. Rear portion 66c of left edge 66 of right armrest 60 is placed to the side close to midline ML with respect to virtual line VL.

As shown in FIG. 4, right armrest 60 has, near rear end 64, a protrusion portion 67 protruding toward midline ML of operator's seat 31 with respect to virtual line VL. Rear portion 66c protrudes toward midline ML of operator's seat 31 with respect to front portion 66a. The left edge of rear region R protrudes toward midline ML of operator's seat 31 with respect to the left edge of front region F. Rear region R includes a portion placed at a shorter distance from midline ML of operator's seat 31 than a distance between front region F and midline ML.

A part of left edge 66 of right armrest 60, which is located in the rear side of the vehicular body, projects toward midline ML of operator's seat 31. Rear end 64 of right armrest 60 has a wider width as compared with front end 63. The size in the left/right direction of rear end 64 of right armrest 60 is larger than the size in the left/right direction of front end 63.

Figure 5:
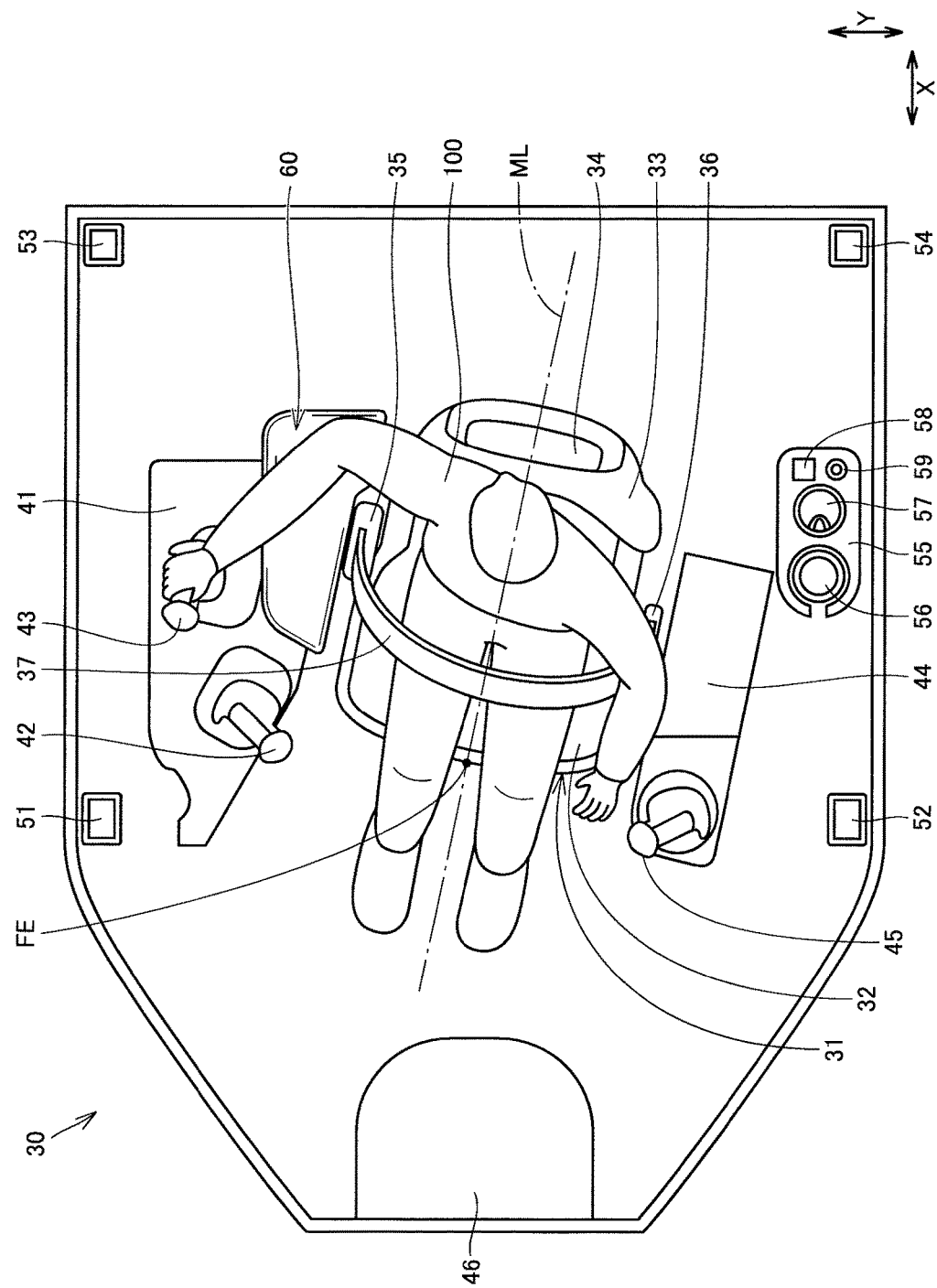
FIG. 5 is a plan view showing the state where an operator sitting in the cab operates a ripper apparatus.

FIG. 5 is a plan view showing the state where an operator 100 sitting in cab 30 operates ripper apparatus 7. Operator 100 shown in FIG. 5 is seated on seating portion 32 of operator's seat 31. A seat belt 37 is pulled out from belt accommodation portion 35, and the locking metal fitting at the tip of seat belt 37 is locked to locking portion 36. Thereby, seat belt 37 is worn around the body of operator 100 sitting on operator's seat 31.

Operator 100 shown in FIG. 5 operates ripper apparatus 7 shown in FIG. 1. Since ripper apparatus 7 is placed in the rear position of vehicular body 1, operator 100 is working with rotating the body and turning to the rear. Operator 100 grasps ripper control lever 43 with right hand. The right elbow of operator 100 is placed on right armrest 60.

Right armrest 60 has protrusion portion 67 protruding toward midline ML of operator's seat 31 and protrusion portion 68 protruding rearward. By forming protrusion portion 67 and protrusion portion 68, the area of right armrest 60 becomes larger on the rear left side. Right armrest 60 has the shape projecting toward operator's seat 31 and rearward. Right armrest 60 has the shape which projects in the direction away from ripper control lever 43. Operator 100 operates ripper apparatus 7 with the right elbow rested on the region where right armrest 60 has a wider space due to protrusion portion 67 and protrusion portion 68.

Next, the function and effect of the present embodiment is explained.

Cab 30 of the present embodiment includes right armrest 60 placed rightward of operator's seat 31 in cab 30, as shown in FIG. 2. Right armrest 60 includes front region F including front end 63 of right armrest 60 and rear region R including rear end 64 of right armrest 60, as shown in FIG. 3. As shown in FIG. 4, rear region R includes a portion placed at a shorter distance from midline ML of operator's seat 31 than a distance between front region F and midline ML.

In the plan view shown in FIG. 4, right armrest 60 has a shape in which the rear thereof is closer to midline ML of operator's seat 31 than the front thereof, and the area of right armrest 60 in the plan view increases. As shown in FIG. 5, operator 100 sitting on operator's seat 31 can rest the right elbow on a portion of right armrest 60 in rear region R closely placed to midline ML of operator's seat 31, and can operate ripper apparatus 7 turning to the rear. Thereby, operator 100 can readily grasp ripper control lever 43 with the right elbow rested on right armrest 60. Moreover, operator 100 can readily rotate the body. Therefore, the workability of ripping can be improved.

When crushing rock and the like using ripper apparatus 7, vibrations transmit to operator 100 seated in cab 30. By working with the posture where the elbow is rested on right armrest 60 of the present embodiment, operator 100 can stabilize the posture of operator 100 during crushing work.

As shown in FIG. 4, left side end portion 64L of rear end 64 of right armrest 60 protrudes rearward with respect to perpendicular line PL which intersects perpendicularly with midline ML of operator's seat 31 and passes right side end portion 64R of rear end 64. By having the shape that rear region R of right armrest 60 projects both toward midline ML and rearward, the area of right armrest 60 in the plan view increases more. Thereby, operator 100 can readily grasp ripper control lever 43 with the right elbow rested on right armrest 60, and therefore, the workability of ripping can be improved.

As shown in FIG. 3, front portion 66a of left edge 66 of right armrest 60 configures the left edge of front region F of right armrest 60. Rear portion 66c of left edge 66 of right armrest 60 configures the left edge of rear region R of right armrest 60. As shown in FIG. 4, rear portion 66c protrudes toward midline ML of operator's seat 31 with respect to front portion 66a. In this way, the area of rear region R of right armrest 60 can be increased, and the gap between front region F of right armrest 60 and operator's seat 31 can be left.

In the plan view shown in FIG. 4, right armrest 60 is formed in the shape which meets the shape of the periphery of operator's seat 31 in order to maintain the distance between right armrest 60 and operator's seat 31. Thereby, belt accommodation portion 35 for accommodating seat belt 37 (FIG. 5) can be placed between right armrest 60 and operator's seat 31. In addition, when operator 100 is seated on operator's seat 31, a contact of deformed operator's seat 31 and right armrest 60 can be restrained.

As shown in FIG. 4, right edge 65 of right armrest 60 extends along the front-rear direction of cab 30. Right armrest 60 has the shape with the wider width of rear region R. Thereby, operator 100 can work with the stable posture with the right elbow rested on right armrest 60 both when operator 100 grasps ripper control lever 43 and when operator 100 grasps blade control lever 42. Therefore, the workability of ripping and digging using blade 2 (FIG. 1) can be improved.

As shown in FIG. 4, midline ML of operator's seat 31 tilts with respect to front-rear direction of cab 30, so that the closer the midline ML is to its frontmost end the further it tilts rightward and the closer the midline ML is to its rearmost end the further it tilts leftward. The shape of right armrest 60 is widen in the left/right direction in accordance with the tilt of operator's seat 31, and the area of right armrest 60 in the plan view is increased. Thereby, operator 100 can readily grasp ripper control lever 43 with the right elbow rested on right armrest 60, and the workability of ripping can be improved.

As shown in FIG. 2, cab 30 includes ripper control lever 43 for operating ripper apparatus 7 placed rearward of cab 30. Right armrest 60 is placed between ripper control lever 43 and operator's seat 31. Operator 100 can readily grasp ripper control lever 43 with the right elbow rested on right armrest 60 of the present embodiment, and the workability of ripping can be improved.

Bulldozer 10 of the present embodiment includes one of the above-mentioned cab 30, and ripper apparatus 7 placed rearward of cab 30. Operator 100 sitting on operator's seat 31 can operate ripper apparatus 7 with the right elbow rested on the portion closely placed to midline ML of operator's seat 31 of rear region R of right armrest 60 and turning to the rear. Thereby, operator 100 can readily grasp ripper control lever 43 with the right elbow rested on right armrest 60. Therefore, the workability of ripping can be improved.

Second Embodiment

Figure 6:
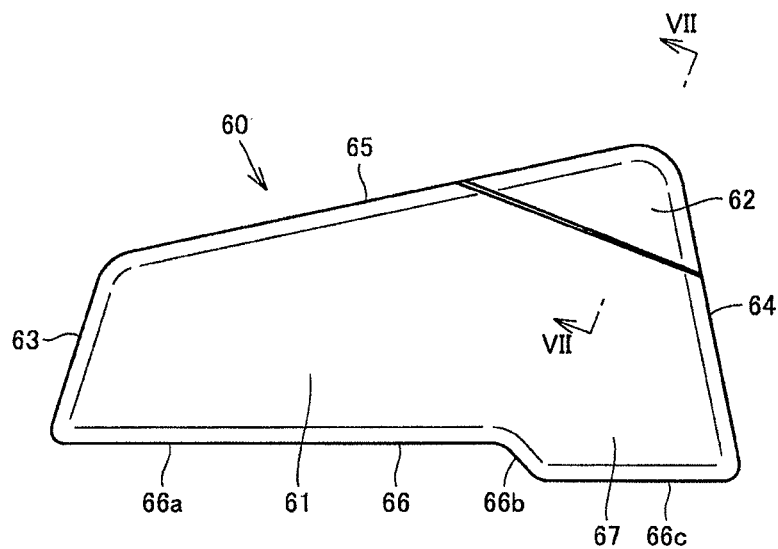
FIG. 6 is a plan view showing the details of the right armrest in the second embodiment of the present invention.
Figure 7:
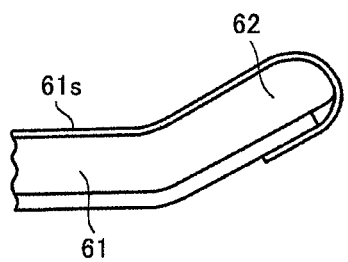
FIG. 7 is a cross sectional view of the right armrest along a line VII-VII shown in FIG. 6.

FIG. 6 is a plan view showing the details of right armrest 60 in the second embodiment of the present invention. FIG. 7 is a cross sectional view of right armrest 60 along a line VII-VII shown in FIG. 6. Right armrest 60 of the second embodiment differs from the first embodiment in that the upper surface has a main body portion 61 with substantially flat shape and a crooked portion 62 crooked with respect to main body portion 61.

Crooked portion 62 is provided in the rear right corner portion of right armrest 60, as shown in FIG. 6. As shown in FIG. 7, crooked portion 62 is crooked upward with respect to main body portion 61. A part of crooked portion 62 is provided above a surface 61s of main body portion 61. Referring also to FIG. 3, the right edge of rear region R of right armrest 60 includes a portion protruding upward with respect to the left edge of rear region R. Right side end portion 64R of rear end 64 of right armrest 60 is placed above left side end portion 64L of rear end 64.

Since the right rear corner portion of right armrest 60 protrudes upward, when operator 100 works grasping blade control lever 42 (FIG. 2), the right elbow of operator 100 rested on right armrest 60 can be supported by the protrusion. Thereby, operator 100 can work in the stable posture with the right elbow rested on right armrest 60, the workability of digging operation using blade 2 (FIG. 1) can be improved.

In the above description, midline ML of operator's seat 31 tilts with respect to the front-rear direction of cab 30. Midline ML may extend in the front-rear direction of cab 30. In this case, operator's seat 31 may be provided in a rotatable manner in a clockwise direction in the plan view, and may be configured so that the operator can readily turn to the rear.

Ripper control lever 43 may be placed leftward of operator's seat 31. In this case, if the left armrest placed leftward of the operator's seat is formed in the symmetrical shape to the above-described right armrest, the effect that the workability of ripping can be improved can be similarly achieved. In this case, midline ML of operator's seat 31 may tilt with respect to the front-rear direction of cab 30 so that the closer the midline is to its frontmost end the further it tilts leftward and the closer the midline is to its rearmost end the further it tilts rightward.

It should be construed that the embodiments disclosed herein are given by way of illustration in all respects, not by way of limitation. It is intended that the scope of the present invention is defined by claims, not by the description above, and encompasses all modifications and variations equivalent in meaning and scope to the claims.

REFERENCE SIGNS LIST 1 vehicular body; 2 blade; 7 ripper apparatus; 10 bulldozer; 30 cab; 31 operator's seat; 35 belt accommodation portion; 36 locking portion; 37 seat belt; 41 right console; 42 blade control lever; 43 ripper control lever; 44 left console; 45 travel control lever; 46 front console; 60 right armrest; 61 main body portion; 61s surface; 62 crooked portion; 63 front end; 64 rear end; 64L left side end portion; 64R right side end portion; 65 right edge; 66 left edge; 66a front portion; 66b connection portion; 66c rear portion; 67, 68 protrusion portion; 100 operator; F front region; FE front end portion; ML midline; PL perpendicular line; R rear region; VL virtual line.

The invention claimed is:

1. A cab for a work vehicle, comprising:
an operator's seat placed in said cab so that a front end portion of said operator's seat is tilted rightward with respect to a front-rear direction of said cab as seen in a plan view; and
an armrest placed rightward of said operator's seat in said cab,
said armrest comprising a front region including a front end of said armrest and a rear region including a rear end of said armrest,
a right edge of said armrest extending in parallel with the front-rear direction of said cab as seen in the plan view,
a left edge of said front region extending in parallel with a midline bisecting said operator's seat as seen in a plan view,
said midline tilting with respect to the front-rear direction of said cab, so that the closer the midline is to said armrest's frontmost end the further said operator's seat tilts rightward and the closer the midline is to said armrest's rearmost end the further said operator's seat tilts leftward, and
said rear region including a portion placed at a shorter distance from said midline, than a distance between said front region and said midline.

2. The cab according to claim 1, wherein a left end of said rear end of said armrest protrudes rearward with respect to a line perpendicular to said midline of the operator's seat and passing a right end of said rear end.

3. The cab according to claim 1, wherein a left edge of said rear region protrudes toward said midline of the operator's seat with respect to the left edge of said front region.

4. The cab according to claim 1, wherein a right edge of said rear region includes a portion protruding upward with respect to a left edge of said rear region.

5. The cab according to claim 1, further comprising a lever for operating a work implement placed rearward of said cab, wherein
said armrest is placed between said lever and said operator's seat.

6. A bulldozer comprising the cab as recited in claim 1.

* * * * *